US011552980B2

(12) United States Patent
Trentini

(10) Patent No.: US 11,552,980 B2
(45) Date of Patent: Jan. 10, 2023

(54) DETECTION OF MULTI-FACTOR AUTHENTICATION AND NON-MULTI-FACTOR AUTHENTICATION FOR RISK ASSESSMENT

(71) Applicant: CyberLucent Inc., San Diego, CA (US)

(72) Inventor: Michael Trentini, Edmonton (CA)

(73) Assignee: CyberLucent Inc., San Diego, CA (US)

( * ) Notice: Subject to any disclaimer, the term of this patent is extended or adjusted under 35 U.S.C. 154(b) by 163 days.

(21) Appl. No.: 16/904,443

(22) Filed: Jun. 17, 2020

(65) Prior Publication Data

US 2020/0396243 A1 Dec. 17, 2020

Related U.S. Application Data

(60) Provisional application No. 62/862,375, filed on Jun. 17, 2019.

(51) Int. Cl.
*H04L 9/40* (2022.01)
*G06K 9/62* (2022.01)
*H04L 9/32* (2006.01)

(52) U.S. Cl.
CPC ........ *H04L 63/1433* (2013.01); *G06K 9/6215* (2013.01); *H04L 9/3247* (2013.01); *H04L 63/1425* (2013.01); *H04L 2463/082* (2013.01)

(58) Field of Classification Search
CPC ............... H04L 63/1433; H04L 9/3247; H04L 63/1425; H04L 2463/082; H04L 63/1408; H04L 63/1416; G06K 9/6215; G06F 21/554; G06F 21/566; H04W 12/61
See application file for complete search history.

(56) References Cited

U.S. PATENT DOCUMENTS

| 10,057,227 | B1* | 8/2018 | Hess | G06F 21/31 |
| 10,496,840 | B1* | 12/2019 | Mehr | G06F 16/345 |
| 2016/0036838 | A1* | 2/2016 | Jain | H04L 63/1416 |
| | | | | 726/23 |

(Continued)

OTHER PUBLICATIONS

Vegh, Laura "Cyber-physical systems security through multi-factor authentication and data analytics," 2018 IEEE International Conference on Industrial Technology (ICIT) Year: 2018 | Conference Paper | Publisher: IEEE.*

(Continued)

*Primary Examiner* — Roderick Tolentino
(74) *Attorney, Agent, or Firm* — Middleton Reutlinger

(57) ABSTRACT

Systems and methods are provided for determining whether or not users of a communication network are implementing Multi-Factor Authentication (MFA) when authenticating with an entity's business tools, applications, and cloud services. This information can be used as component in the calculation of a risk score that can help quantify and assess the risk posture of the entity. In some embodiments, network traffic flow metadata may be used to anonymously identify user data to assess the entity's use of MFA in determining enterprise risk that may not rely on questionnaires, surveys, manual data entry, and/or interviews. Embodiments of the application can produce a real-time analysis of the security risk of the system.

15 Claims, 10 Drawing Sheets

(56) References Cited

U.S. PATENT DOCUMENTS

| | | | |
|---|---|---|---|
| 2016/0072834 A1* | 3/2016 | Bott | H04L 63/145 |
| | | | 726/1 |
| 2016/0212100 A1* | 7/2016 | Banerjee | H04L 63/08 |
| 2018/0013782 A1* | 1/2018 | Choyi | H04L 63/108 |
| 2018/0027006 A1* | 1/2018 | Zimmermann | G06F 21/6218 |
| | | | 726/11 |
| 2018/0338010 A1* | 11/2018 | Llanos Alonso | G06F 21/56 |
| 2020/0042723 A1* | 2/2020 | Krishnamoorthy | G06F 21/45 |
| 2020/0151724 A1* | 5/2020 | Edwards | G06Q 20/38215 |

OTHER PUBLICATIONS

Fujita et al., "Implementation and Evaluation of a Multi-Factor Web Authentication System with Individual Number Card and WebUSB," 2019 20th Asia-Pacific Network Operations and Management Symposium (APNOMS) Year: 2019 | Conference Paper | Publisher: IEEE.*
https://riptutorial.com/algorithm/example/24981/introduction-to-dynamic-time-warping . Retrieved on Aug. 28, 2022.
https://github.com/slaypni/fastdtw Retrieved on Aug. 28, 2022.
https://docs.scipy.org/doc/scipy/reference/generated/scipy.spatial.distance.cosine.html Retrieved on Aug. 28, 2022.

* cited by examiner

DETECTION OF MULTI-FACTOR AUTHENTICATION AND NON-MULTI-FACTOR AUTHENTICATION FOR RISK ASSESSMENT

CROSS REFERENCE TO RELATED APPLICATIONS

The current application is a non-provisional patent application of U.S. Patent Application No. 62/862,375, titled "Detection of Multi-Factor Authentication and Non-Multi-Factor Authentication for Application Logins for Enterprise Cyber-Risk Assessment," filed on Jun. 17, 2019, which is hereby incorporated by reference in its entirety for all purposes.

BACKGROUND

Multi-factor authentication is an authentication system that requires more than one distinct authentication factor for successful authentication, including providing a personal identification number (PIN) and a password. The most common method used today is when a user provides their password to an entity and then receives a one-time password (OTP) through an out of band channel, like a text message to a cell phone. However, these authentication methods are prone to security risks. Better methods for authenticating a user are needed.

BRIEF SUMMARY OF EMBODIMENTS

A method is disclosed for determining a risk score of a communication network. The method comprises receiving network traffic metadata from user interactions on a user device, the network traffic metadata associated with user logins to an entity via the communication network; constructing a plurality of digital signatures of the network traffic metadata associated with the user device, wherein the plurality of digital signatures are adjusted using a signature calculation process; determining a first reference model for the network traffic metadata, wherein a first subset of the user logins to the entity via the communication network are associated with multi-factor authentication; determining a second reference model for the network traffic metadata, wherein a second subset of the user logins to the entity via the communication network are associated with non-multi-factor authentication; and calculating a risk score based on a comparison of the first subset of the user logins to the entity network and the second subset of the user logins to the entity via the communication network found in the network data.

In some examples, the signature calculation process is a dynamic time warping process. In some examples, a subset of the plurality of digital signatures are associated with an unclassified authentication process.

In some examples, the subset of the plurality of digital signatures that are associated with the unclassified authentication process are compared with the first reference model and the second reference model using a cosine similarity process.

In some examples, the subset of the plurality of digital signatures that are associated with the unclassified authentication process are classified as multi-factor authentication or non-multi-factor authentication based on greater similarity to the first reference model or the second reference model, respectively, or based on the absolute values of cosine calculations.

A computer program product is disclosed for determining a risk score of a communication network, based on the method above.

A computer system is disclosed for determining a risk score of a communication network, based on the method above.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The following description covers particular embodiments of the application, set out to enable one to practice an implementation of the embodiments, and is not intended to limit the preferred embodiment, but to serve as particular examples thereof. Those skilled in the art should appreciate that they may readily use the conception and specific embodiments disclosed as a basis for modifying or designing other methods and systems for carrying out the same purposes of the embodiments. Those skilled in the art should also realize that such equivalent assemblies do not depart from the spirit and scope of the invention in its broadest form.

In accordance with some embodiments of the application, systems and methods are configured to determine whether or not users of a communication network are implementing Multi-Factor Authentication (MFA) when authenticating with an entity's business tools, applications, and cloud services. This information can be used as component in the calculation of a risk score that can help quantify and assess the risk posture of the entity. In some embodiments, network traffic flow metadata may be used to anonymously identify user data to assess the entity's use of MFA in determining enterprise risk that may not rely on questionnaires, surveys, manual data entry, and/or interviews. Embodiments of the application can produce a real-time analysis of the security risk of the system.

Figure 1:
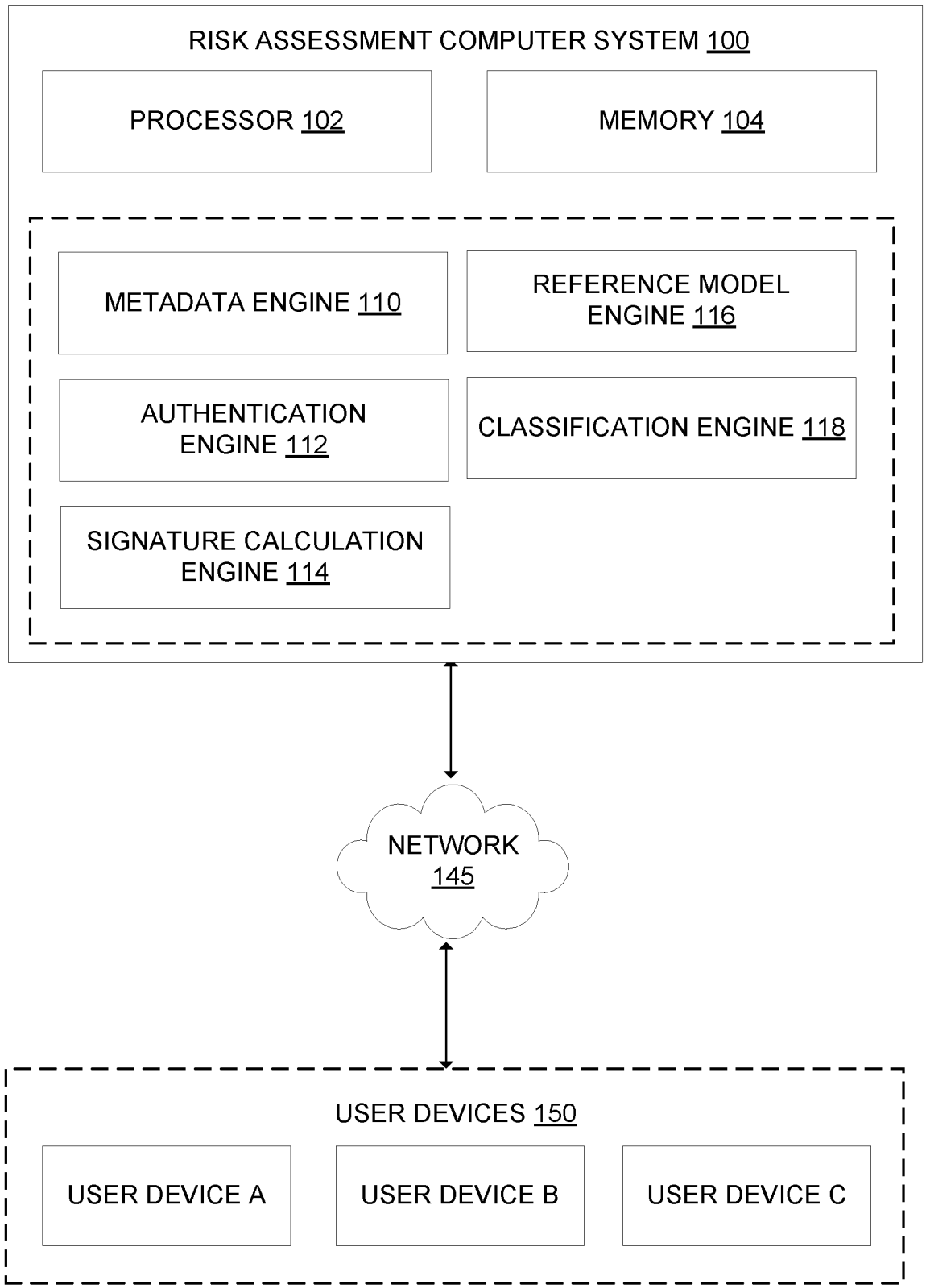
FIG. 1 illustrates a risk assessment computer system, network, and user devices for calculating a risk score of an entity, in accordance with some embodiments of the application.

FIG. 1 illustrates a risk assessment computer system, network, and user devices for calculating a risk score of an entity, in accordance with some embodiments of the application. Risk assessment computer system 100 includes processor 102, memory 104 with computer executable instructions embedded thereon, and a plurality of engines, including metadata engine 110, authentication engine 112, signature calculation engine 114, reference model engine 116, and classification engine 118. Risk assessment computer system 100 may be in communication with one or more user devices 150 via communication network 145.

As used herein, the terms logical circuit and engine might describe a given unit of functionality that can be performed in accordance with one or more embodiments of the technology disclosed herein. Each of the logical circuits or engines might be implemented utilizing any form of hardware, software, or a combination thereof.

As used herein, one or more processors, controllers, ASICs, PLAs, PALs, CPLDs, FPGAs, logical components, software routines, or other mechanisms might be implemented to make up an engine. In some embodiments, the various engines described herein might be implemented as discrete engines or the functions and features described can be shared in part or in total among one or more engines. In other words, as would be apparent to one of ordinary skill in the art after reading this description, the various features and functionality described herein may be implemented in any given application and can be implemented in one or more separate or shared engines in various combinations and permutations. Even though various features or elements of functionality may be individually described or claimed as separate engines, one of ordinary skill in the art will understand that these features and functionality can be shared among one or more common software and hardware elements, and such description shall not require or imply that separate hardware or software components are used to implement such features or functionality.

Metadata engine 110 may be configured to receive network traffic metadata from user interactions on a user device 150 via network 145. The network metadata may include information associated with a series of multi-factor authentication (MFA) login events to a software application installed on user device 150 or accessed remotely on risk assessment computer system 100.

The MFA login events may comprise two or more types of authentication factors. For example, a first type may include "something you know." This can include a password, personal identification number (PIN), a combination of password/PIN, code word, or secret handshake. The first type of authentication may include anything that the user can remember and then type, say, do, perform, or otherwise recall. In another example, a second type of authentication may include "something you have." This can include all items that are physical objects, such as keys, smart phones, smart cards, universal serial bus (USB) drives, and token devices. In some examples, a token device may be used to produce a time-based PIN or can compute a response from a challenge number issued by the server. The third type of authentication may include "something you are." This can include any part of the human body that can be offered for verification, such as fingerprints, palm scanning, facial recognition, retina scans, iris scans, and voice verification. The MFA login may include two or more of these authentication types (e.g., two type one authentication, one type two authentication and one type three authentication, etc.).

Metadata engine 110 may also be configured to capture network flow traffic produced by user logins to risk assessment computer system 100 by a sensor collecting the network flow traffic metadata. In some examples, the sensor may send only metadata to the cloud and not payload data of the packet itself. Network flow traffic metadata may be stored in a cloud database and include items such as application detection, bandwidth monitoring, DNS reports, geo-location, IP address, MAC address, and protocol detection among a long list of others.

The sensor may correspond with a cross-platform engine that can extract network packet data to obtain the metadata. For example, the sensor may correspond with an open source deep packet inspection (DPI) and analytics engine (e.g., available for Linux and/or other operating system, etc.). In some examples, the transfer of data to the cloud may occur over HTTPS using a JSON payload format.

The sensor may extract the data through a supported gateway. For example, if the sensor can be ported and installed on the gateway, a packet capture process may be implemented by binding directly to a LAN port prior to egressing the network. This can allow classification to be done on a per device basis. Additional information may be determined as well, including source and destination identifiers.

The sensor may extract the data through mirror port ingestion. For example, a switch may support port mirroring in order to receive and duplicate network traffic through an active port. The switch may provide a mirror copy via another port to the sensor. This alternate port can be directed towards a running agent listening on a network interface.

Authentication engine 112 may be configured to construct digital signatures. For example, signatures of known MFA logins, either time series or network flow, can be constructed from a query of the network traffic metadata. Authentication engine 112 may be configured to generate and submit the query to the database. The query may be formulated to return the total number of bytes sent and/or received, on a time or network flow basis, representing the network traffic communication during the MFA login session. This includes any communication between the user device, related corporate business tools, application or cloud service server, and MFA authentication servers during these respective MFA login sessions.

In an illustrative example, the query may filter digital signatures stored with the database. The filtering may be based on a media access control (MAC) address of user device 150 (e.g. the device used for MFA logins), application hostname (e.g. Microsoft), and MFA authentication services hostname. The output of the query may return a total number of bytes sent and/or received during the MFA login communication session. The total bytes can be in the form of either time series or flow series data.

Figure 2:
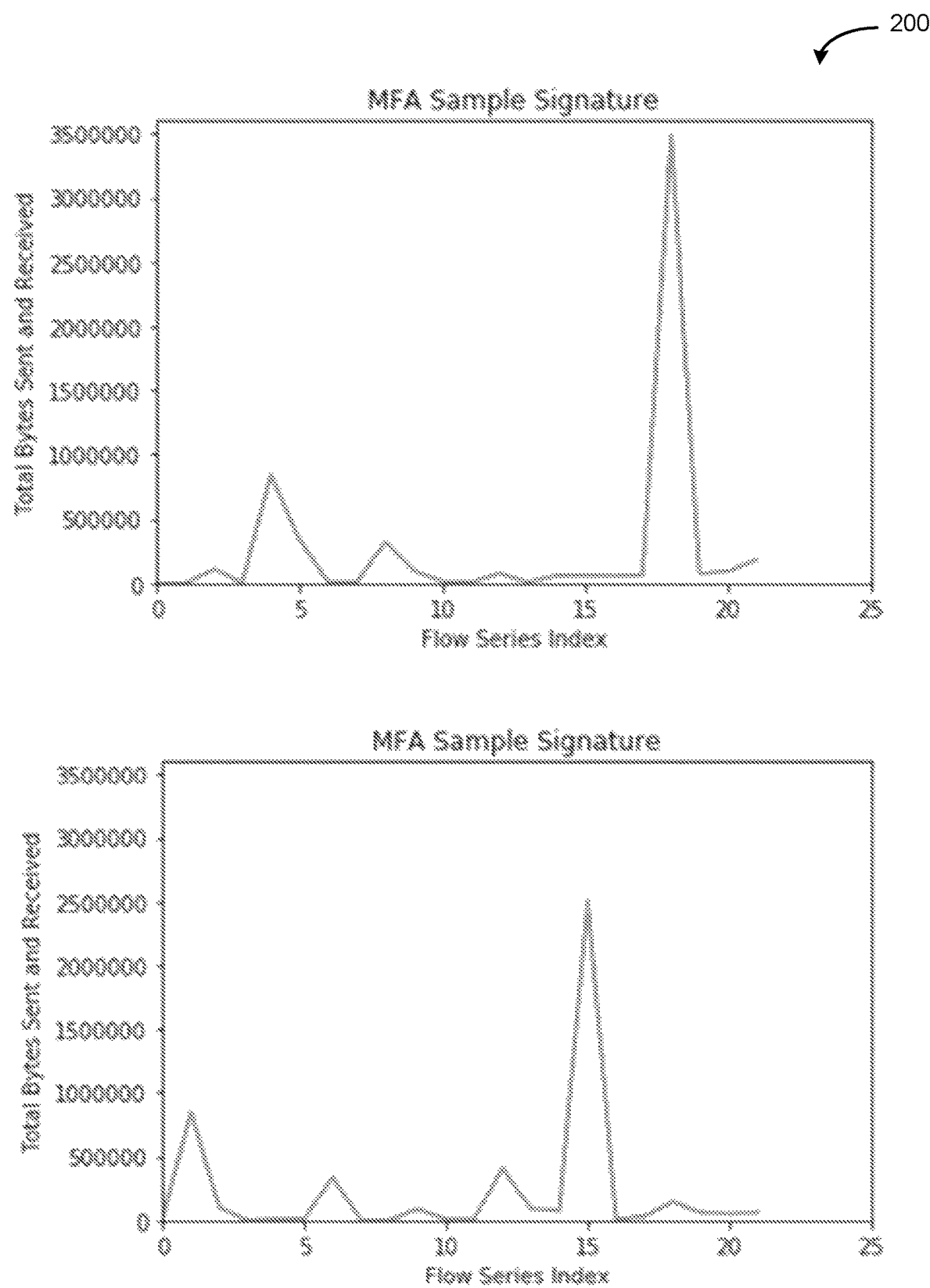
FIG. 2 illustrates examples of MFA user logins in the form of flow series data index in the x-axis versus total bytes in the y-axis, in accordance with the embodiments disclosed herein.

FIG. 2 illustrates two examples of MFA user logins, in accordance with the embodiments disclosed herein. In illustration 200, the MFA user logins are in the form of flow series data index in the x-axis versus total bytes in the y-axis. Each MFA login session can depict a time to enter the MFA code received at the user device and entered into a Microsoft Office 365 login window, as an example. These and other illustrative examples may correspond with different environmental factors, including different response times, as fast as possible, at a normal pace, and/or with added delays. In some examples, the delays may be inherent due to infrastructure and/or network delays.

The MFA login signatures provided with illustration 200 may comprise unique patterns that inherently vary with each login. As shown, the number and size of peaks and the span between peaks vary. For example, the span between the smaller first peaks representing the initial login process and the subsequent delayed larger peaks representing successful user login is greater in the first login example than the second. Upon successful user login, the user device can access an entity's software applications, business tools, or cloud services.

The span between the smaller initial peaks and larger later peaks provided with illustration 200 may be a function of time delay. This time delay can be both a function of individual user behavior and infrastructure. For example, the user behavior may include delayed MFA authentication from varied time required for individuals to read authentication codes on their user device and subsequent time to enter the code. Infrastructure delay may include network delays due to network traffic speeds or differences in the locations of the user device and MFA authentication servers.

Returning to FIG. 1, risk assessment computer system 100 may also comprise signature calculation engine 114. Signature calculation engine 114 may be configured to calculate an average digital signature. For example, the digital signatures used in the calculation of an average signature may be used to generate an MFA reference model representative of typical MFA logins. In some examples, no single MFA sample signature can best describe all login scenarios. An average of the MFA sample signatures may be needed to incorporate this information from various dependencies (e.g., user behavior and infrastructure, etc.).

An average digital signature may be calculated using various methods. In a first example, the method may comprise finding the beginning of the login sequence. The process may find the beginning of a login sequence using an identifier on the web application or other business tool, as an example, that may correspond with a start of authenticating a web-based session. The session may correspond with a unique domain that is either part of the traffic flow or the DNS request just prior to the flow traffic (e.g., DNS hinting). The end of the login session occurs when a threshold bandwidth is exceeded, to indicate that the user device is pulling assets not related to authentication (e.g., mail, a document, etc.).

In a second example, the method may comprise finding a time range of applicable activity between user device 150 and risk assessment computer system 100. The time range could correspond with a "sliding window" over a live-filtered capture (e.g., by protocol and/or application) with a predetermined window size threshold (e.g., 2 minutes) to be used in the cosine calculation to compare unclassified logins to each reference model. In some examples, this process can be used to determine candidate logins from the client network metadata for subsequent calculation and classification using the sliding window.

In some examples, the process of determining a time frame for classifying logon signatures may correspond with an estimation to determine normal patterns of usage based on human behavior and technology implementation. For example, the risk may be determined using an aggregate series of logins over a sample time period (e.g., a month, etc.). By extending the sampling time period, missing a particular logon event may not be detrimental to the average digital signature or corresponding risk calculation.

Signature calculation engine 114 may be configured to execute a process to measure similarities between sample signatures. For example, this may comprise a dynamic time warping (DTW) process. Illustrative pseudo code of this process may include:

```
Procedure Signature_Calculation (DigitalSignal1, DigitalSignal2):
    n := DigitalSignal1.length
    m := DigitalSignal2.length
    Create Table[n + 1][m + 1]
    for i from 1 to n
        Table[i][0] := infinity
    end for
    for i from 1 to m
        Table[0][i] := infinity
    end for
    Table[0][0] :=0
    for i from 1 to n
        for j from 1 to m
            Table[i][j] := d(DigitalSignal1 [i], DigitalSignal2 [j])
                + minimum(Table[i-1][j-1],   //match
                    Table[i][j-1],   //insertion
                    Table[i-1][j])   //deletion
        end for
    end for
    Return Table[n + 1][m + 1]
```

Signature calculation engine 114 may also be configured to measure similarity between two temporal sequences which may vary in speed, for example, using the equation illustrated herein. As a sample illustration, similarities in walking could be detected even if one person was walking faster than the other or if there were accelerations and decelerations during the course of an observation. As another sample illustration, similarities between a sample voice command with other voice commands may be detected even if the person talks faster or slower than the pre-recorded sample voice. The similarity can be detected in temporal sequences of video, audio, graphics data, or other linear sequence data.

Signature calculation engine 114 may also be configured to compute a local stretch or compression to apply to time axes of two time series in order to optimally map one (query) onto the other (reference). In this manner, the process can eliminate at least some of the time variability from the MFA login sequences, allowing a dependable reference model to be created based on an average of known login signatures.

Signature calculation engine 114 may also be configured to train a machine learning (ML) model to take the time series as input and output a probability that the time series belongs to each class, such as MFA. The ML model can be used to detect more complicated signatures by selecting more than a single point, like average digital signature, to represent the probability distribution of membership in a class.

Signature calculation engine 114 may also be configured to output a measure of a temporal sequence's membership in a class of temporal sequences. This measure could indicate the similarity between the input temporal sequence and a sequence representing the class, or the probability that the input sequence belongs to the class. Other algorithms to calculate the output measure could be based on first extracting features of the time series in specific domains, including but not limited to the time or frequency domains, such as the "collective of transformation-based ensembles (COTE)" algorithm, using convolutional neural network models with architectures, or using combinations or ensembles of models and algorithms. Signature calculation engine 114 may also be configured to incorporate multiple Deep Learning (DL) models, including from Computer Vision (CV) and Audio Signal Processing models. The models may be applied to longitudinal (time-series) data.

A similarity of a time series may be evaluated using various methods. For example, Euclidean distance (ED), distance based on Longest Common Subsequence (LCSS), Edit Distance with Real Penalty (ERP), Edit Distance on Real sequence (EDR), DISSIM, Sequence Weighted Alignment model (Swale), Spatial Assembling Distance (SpADe), or similarity search based on Threshold Queries (TQuEST).

Figure 3:
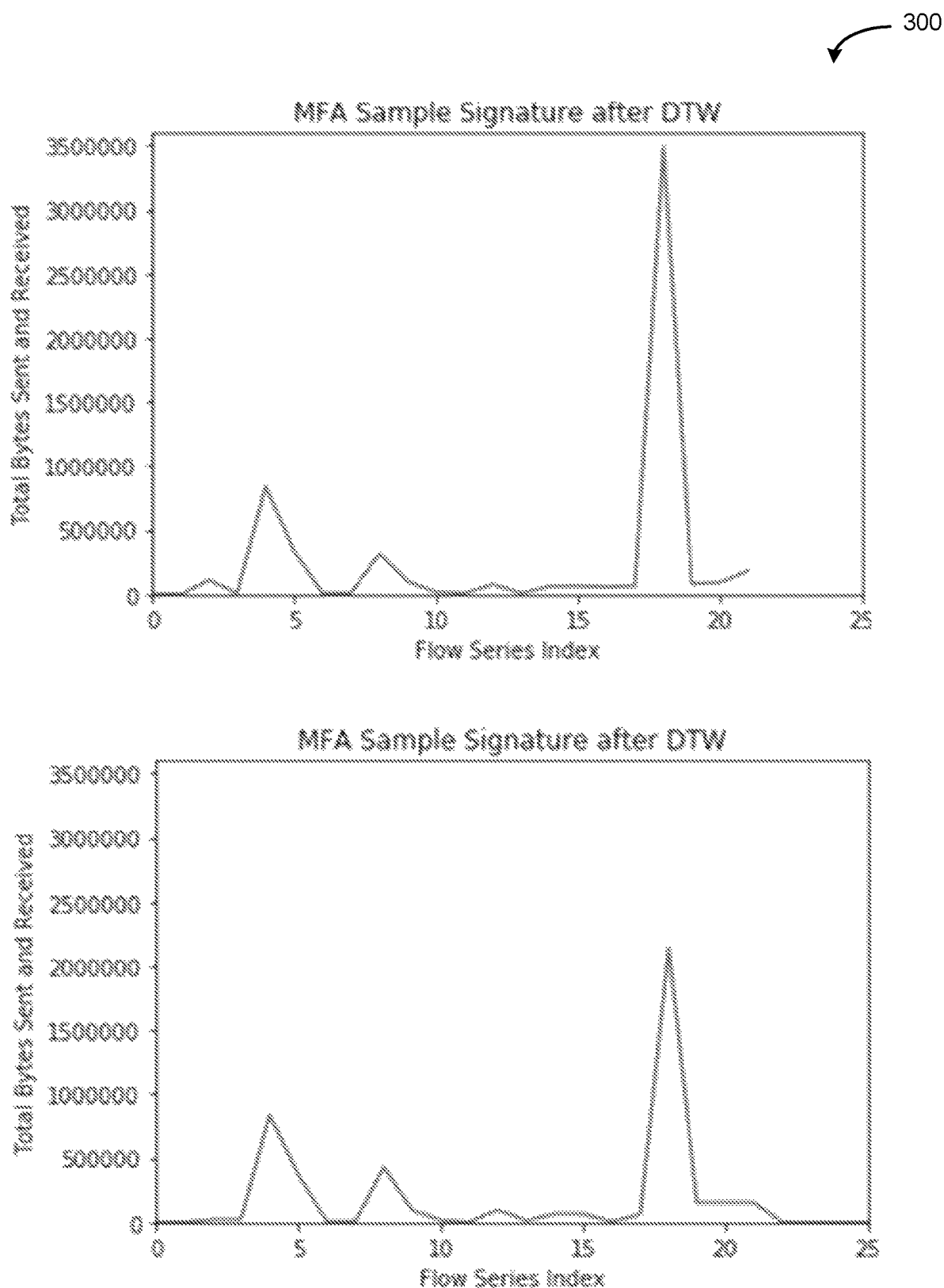
FIG. 3 illustrates a mapping of MFA digital signatures onto a candidate reference, in accordance with the embodiments disclosed herein.

Signature calculation engine 114 may also be configured to map each digital signature onto a candidate reference digital signature sample. The candidate reference signature sample may be selected based on selecting the sample that includes an average span between initial and later larger peaks. Using the two sample signatures in illustration 200 of FIG. 2, the candidate reference digital signature sample may be mapped. The resulting optimal mapping of MFA sample signatures onto the candidate reference is depicted in FIG. 3. These values may be stacked or otherwise combined to create an average signature without creating a flat or featureless combined signature.

The candidate reference signature sample may be generated using other methods as well. For example, both MFA and Non-MFA logons can be generated in a laboratory setting representing natural human behavior and a predetermined sample size. The first step in this process is to find a reliable indicator that a login event is being initiated. This can be done using DNS hinting, as described herein, where a DNS request being made by the client just prior to the loading of web-based login page contains a unique hostname found to be used exclusivity with authentication. Most, if not all, SaaS models may fall into this category since authentication infrastructure is a service used from many disparate endpoints. Next, filters may be applied to capture all data that are inclusive (AND operator) to a type of application detected, time (e.g., after login signature detection), and/or MAC address (e.g., to focus on the single user device being analyzed). A predetermined time limit may cut-off the amount of data received to take a snapshot of the data that will then be used in determining the digital signature (e.g., post-processing using DTW) and analysis (e.g., cosine comparison) to the trained model.

The candidate reference signature sample may be generated using an algorithm, such as a Euclidean distance algorithm, to find time series logon signatures that are most similar. This set of similar signatures may be used as a model for the candidate reference signature sample straight away or as the candidate reference model upon which all other samples are compared with (e.g., using the DTW algorithm).

An average of signatures may be used to create the candidate reference signature that can also chose the "right" reference model, including nonlinear alignment and averaging filters (NLAAF), Dynamic Time Warping Barycenter Averaging (DBA), and COmpact Multiple Alignment for Sequence Averaging (COMASA).

Signature calculation engine 114 may employ a dynamic time warping (DTW) process. Dynamic time warping may be beneficial for several reasons. For example, the MFA login signatures, although similar, may be inherently unique. The size of peaks and spans between peaks makes comparison and classification difficult. Specifically, the span between peaks is a function of both the login and authentication infrastructure. The uniqueness may be caused by delays due to network latency and/or the geolocation of users, application, and MFA authentication servers. In some examples, user behaviors may affect the uniqueness of the digital signatures, including varied response times of users to receive and enter authentication codes from their mobile device to their personal computing device. Thus, simply averaging the MFA sample signatures can destroy existing peaks and create new false peaks in the generation of the MFA reference model, likely producing an average signature that is flat or featureless as a natural result. Additionally, this averaging can (i) capture features from all MFA login scenarios (e.g. user behavior and infrastructure dependencies) and (ii) produce an MFA reference model that retains features from the MFA sample signatures.

Signature calculation engine 114 may employ an alternative to DTW, including Derivative Dynamic Time Warping (DDTW), shape Dynamic Time Warping (shapeDTW), Continuous Dynamic Time Warping (CDTW), or Dynamic Time Warping Delta (DTW-D).

Figure 4:
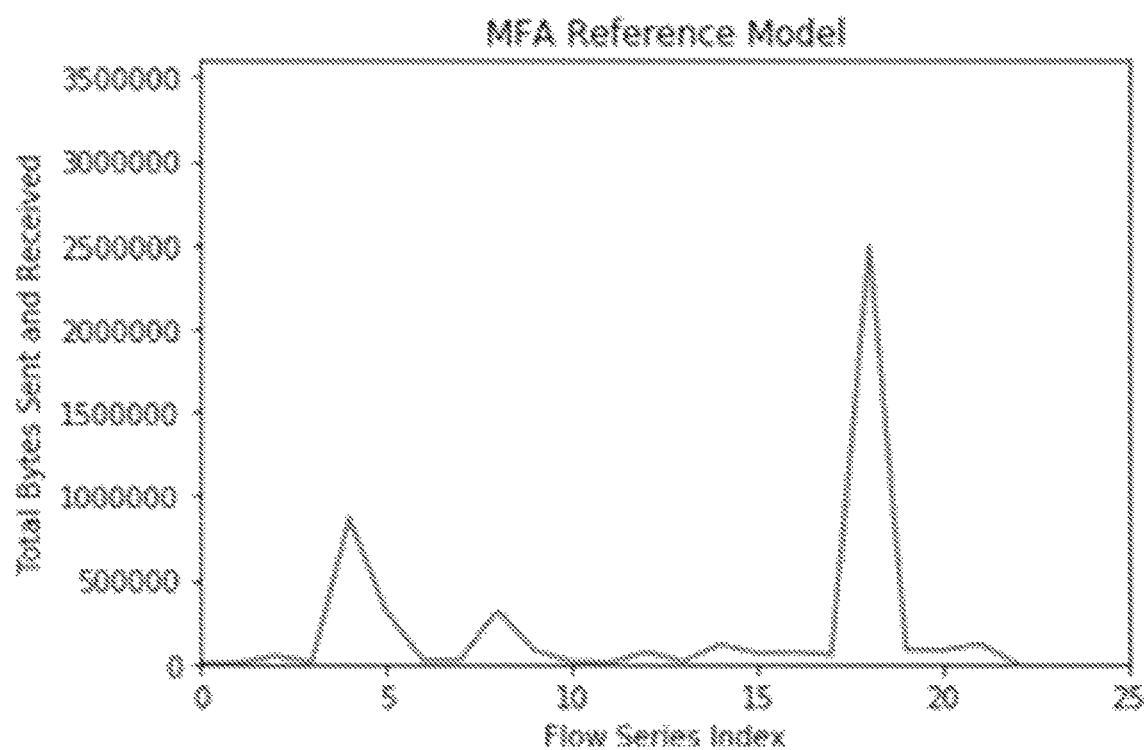
FIG. 4 illustrates an MFA reference model, in accordance with the embodiments disclosed herein.

Returning to FIG. 1, risk assessment computer system 100 also comprises reference model engine 116. Reference model engine 116 may be configured to generate an MFA reference model. For example, using the mapping of sample signatures onto the candidate reference generated from signature calculation engine 114, one or more reference models may be generated based on an average of varied login sessions and their respective MFA sample signatures. FIG. 4 illustrates a sample MFA reference model using the average signatures, in accordance with the embodiments disclosed herein.

Figure 5:
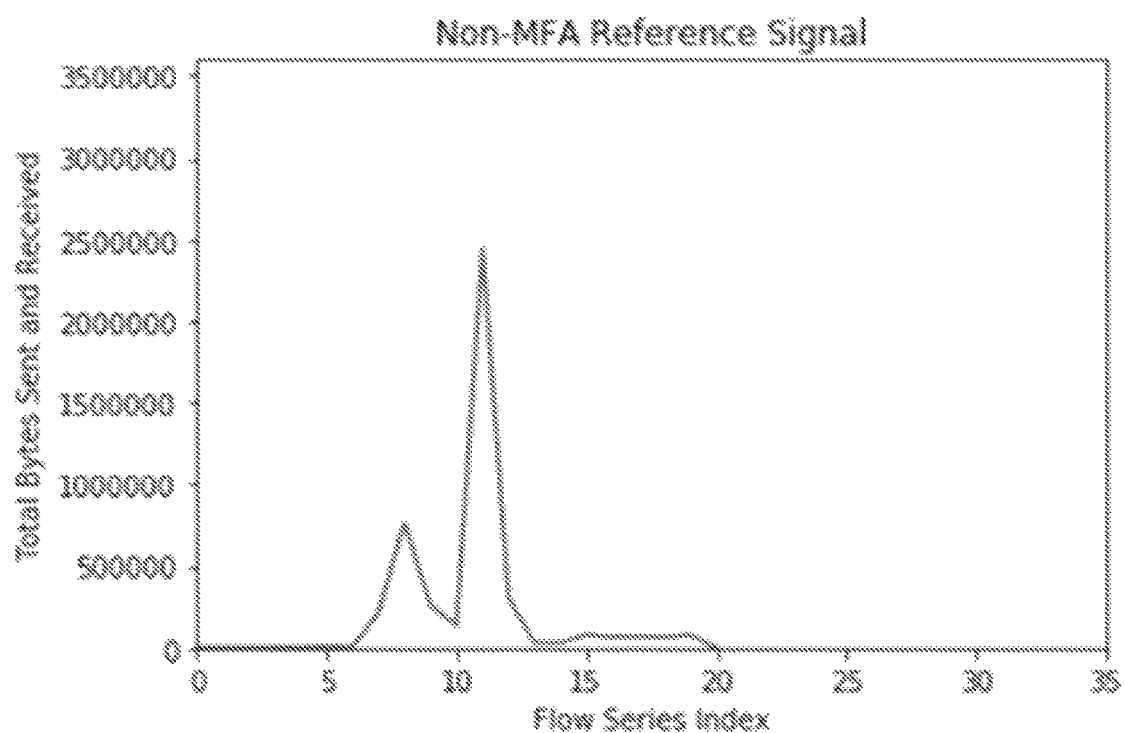
FIG. 5 illustrates a non-MFA reference model, in accordance with the embodiments disclosed herein.

Reference model engine 116 may also be configured to generate a non-multi-factor authentication (non-MFA) reference model. For example, a similar methodology may be used to generate a reference model from known non-MFA logins. A sample illustration of a non-MFA login is provided in illustration 500 of FIG. 5. As shown, there is a reduced span of time between initial and later larger peaks. This may correspond with immediate non-MFA logins after password entry. The reduced span of time between initial and later larger peaks may correspond with a characteristic of non-MFA logins and not MFA logins.

Reference model engine 116 may also be configured to generate an unclassified user login model against the MFA and non-MFA reference models. For example, authentication engine 112 may query metadata and receive the total number of bytes sent and/or received, on a time or network flow basis, representing the network traffic communication during the login session. The unclassified user logins may be constructed using signature calculation engine 114 to first compare against the MFA reference model and then compare against the non-MFA reference model to help determine best fit, as illustrated with classification engine 118.

Figure 6:
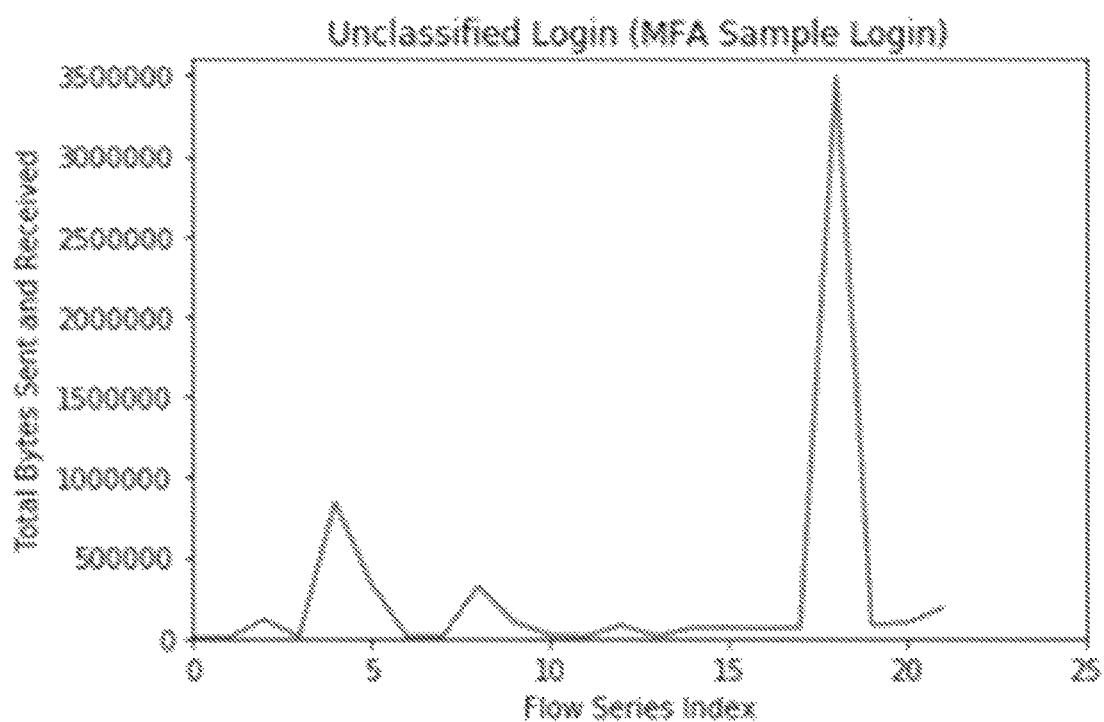
FIG. 6 illustrates an unclassified user login, in accordance with the embodiments disclosed herein.

Classification engine 118 may be configured to use the MFA reference model and non-MFA reference model for classification of the unclassified user login data, as illustrated in FIG. 6. For example, a query of the database may return all user logins for a particular time period of interest, including MFA and non-MFA user logins and reference models. Signature calculation engine 114 may warp the yet unclassified user logins to each reference model for comparison. Once compared, the unclassified user logins may be classified to the reference model that is the best fit and match, based on a predefined mathematical criterion (e.g., a cosine similarity between the signal as applied to the DTW algorithm and the reference models, etc.) and minimum accepted numerical boundary condition.

In some examples, the cosine similarity may compute the cosine distance between the user login, after applying the signature calculation process, and the reference models. In some examples, this process can be used to determine candidate logins from the client network metadata for subsequent calculation and classification using the sliding window. An illustrative equation to compute cosine similarity may include the following formula, where "u" is an input array of the login signal as a function of time or network data and "v" is an input array of the reference model:

$$1 - \frac{u \cdot v}{\|u\|_2 \|v\|_2}.$$

In some examples, a minimum accepted numerical boundary condition is implemented. The range of the minimum accepted numerical boundary condition may be determined by repeatedly running test/known MFA logins against the latest model version. The average of the minimums can be used as the minimum accepted boundary condition.

Figure 7:
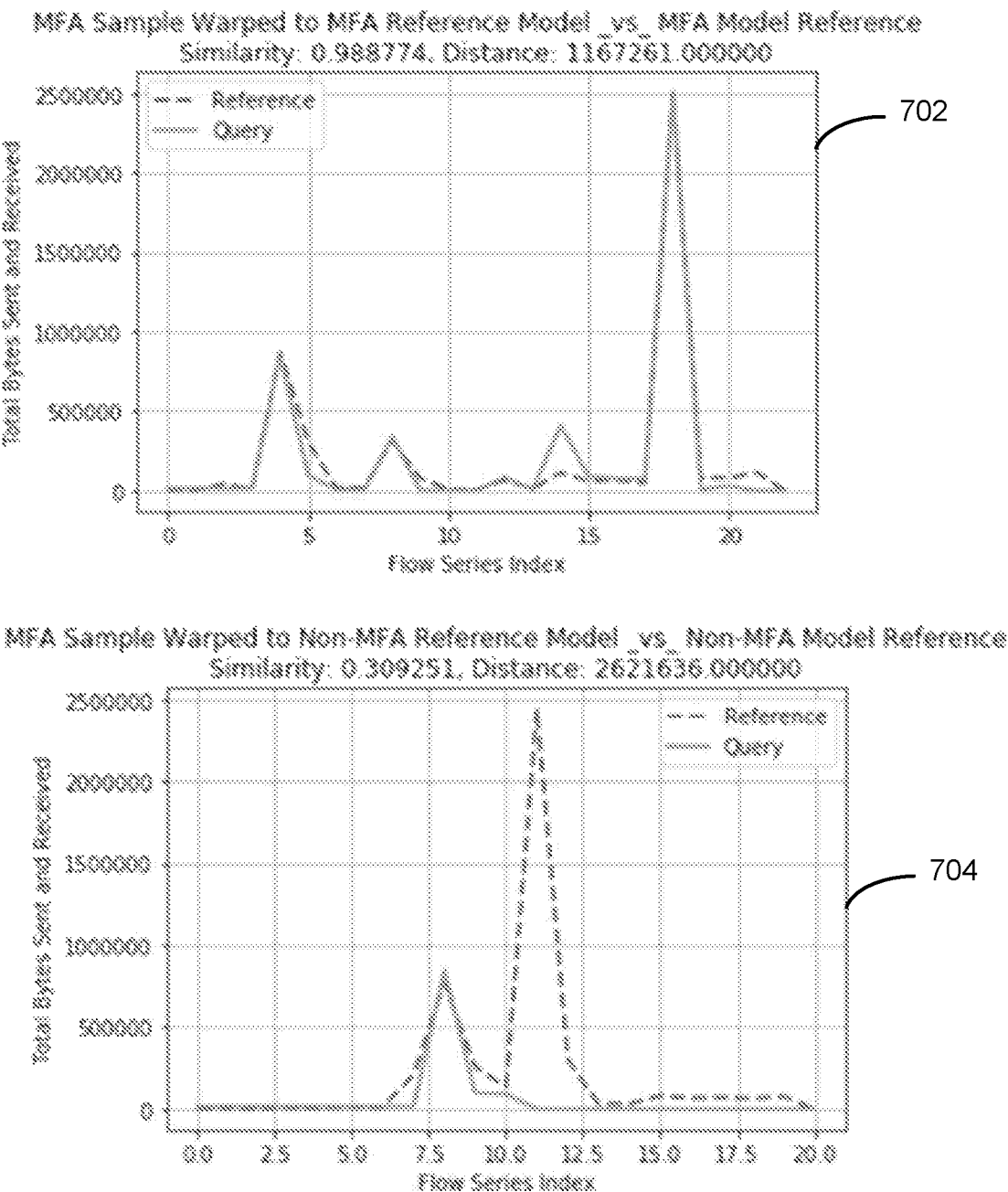
FIG. 7 illustrates a comparison of an unclassified user login, MFA user login, and non-MFA user login, in accordance with the embodiments disclosed herein.

An illustrative sample of classifying the unclassified user logins is shown in FIG. 7. In the sample illustrations, the unclassified login is associated with a solid line and compared with the MFA reference model 702 and the non-MFA reference model 704 based on a scale of 0-1 with higher value indicative of a better match. In these examples, the cosine similarity of the unclassified login to the MFA reference model 702 is 0.99. The cosine similarity of the unclassified login to the non-MFA reference model 704 is 0.31. Thus, the login being queried (e.g., the unclassified login) is classified as MFA.

Returning to FIG. 1, classification engine 118 may also be configured to calculate a risk score. The risk score can be calculated based on the percentage of MFA logins found in the total number of logins over the defined time period. The lower the percentage, the lower the adoption or use of MFA for secure login to corporate business tools, applications, and cloud services is determined for an entity, thus posing a higher cyber-risk to the organization.

The risk score may have various uses. For example, the risk score may be assigned to an entity or to an individual based on the percentage of users that employ MFA throughout the organization (e.g., the lower the percentage that use MFA, the higher the risk for a company overall, etc.). In some examples, the risk score may be used to detect cyber-personas to classify employee roles. For example, using algorithms to identify whether an individual belongs to engineering, software developers, human resources, finance, or C-level executives, the risk score can assign risk for a user based on their adoption of MFA or not. For example, a C-level executive that is found to not employ MFA puts a company at higher risk potentially than other employees, as an example.

The risk score may be transmitted to various devices from risk assessment computer system 100. For example, the risk score may be calculated for all individual user devices that connect to risk assessment computer system 100 and a percentage usage may be reported back to risk assessment computer system 100 for further analysis. The risk score may be altered based on an identification of a particular user and/or the user's access to sensitive data in their role with the entity as part of the overall calculation in terms of percentage adoption of MFA across an organization.

The risk score may be used to determine a recommendation. For example, the recommendation may be to increase MFA usage to decrease risk overall for the entity. In another example, access to business tools may be restricted without use of MFA logins. In some examples, a nationally publicized list of security and privacy controls for information systems and organizations may be used as a baseline to alter access to the entity and decrease risk to the systems (e.g., NIST Special Publication 800-53, control enhancements IA-2(1) and IA-2(2), etc.).

Having now set forth various embodiments and certain modifications of the disclosure, various other embodiments as well as certain variations and modifications of the embodiments will obviously occur to those skilled in the art upon becoming familiar with the underlying concept. For example, faster techniques for computing DTW could be employed including PrunedDTW, SparseDTW and FastDTW. Further, faster sampling and thus better resolution of the network traffic flow could yield better signatures for comparison. This is one of the benefits and reason for parts described herein, which is the ability to recapture information lost to sampling by creating a reference model from many login signatures allowing opportunity to collect features from many sources. Further, it is envisaged that certain embodiments have the potential to be used for the detection of other network signatures, although the creation of a reference model that captures user behavior as a method for comparison and classification is unique. It should be understood, therefore, that embodiments of the application may be practiced otherwise than as specifically set forth herein.

Figure 8:
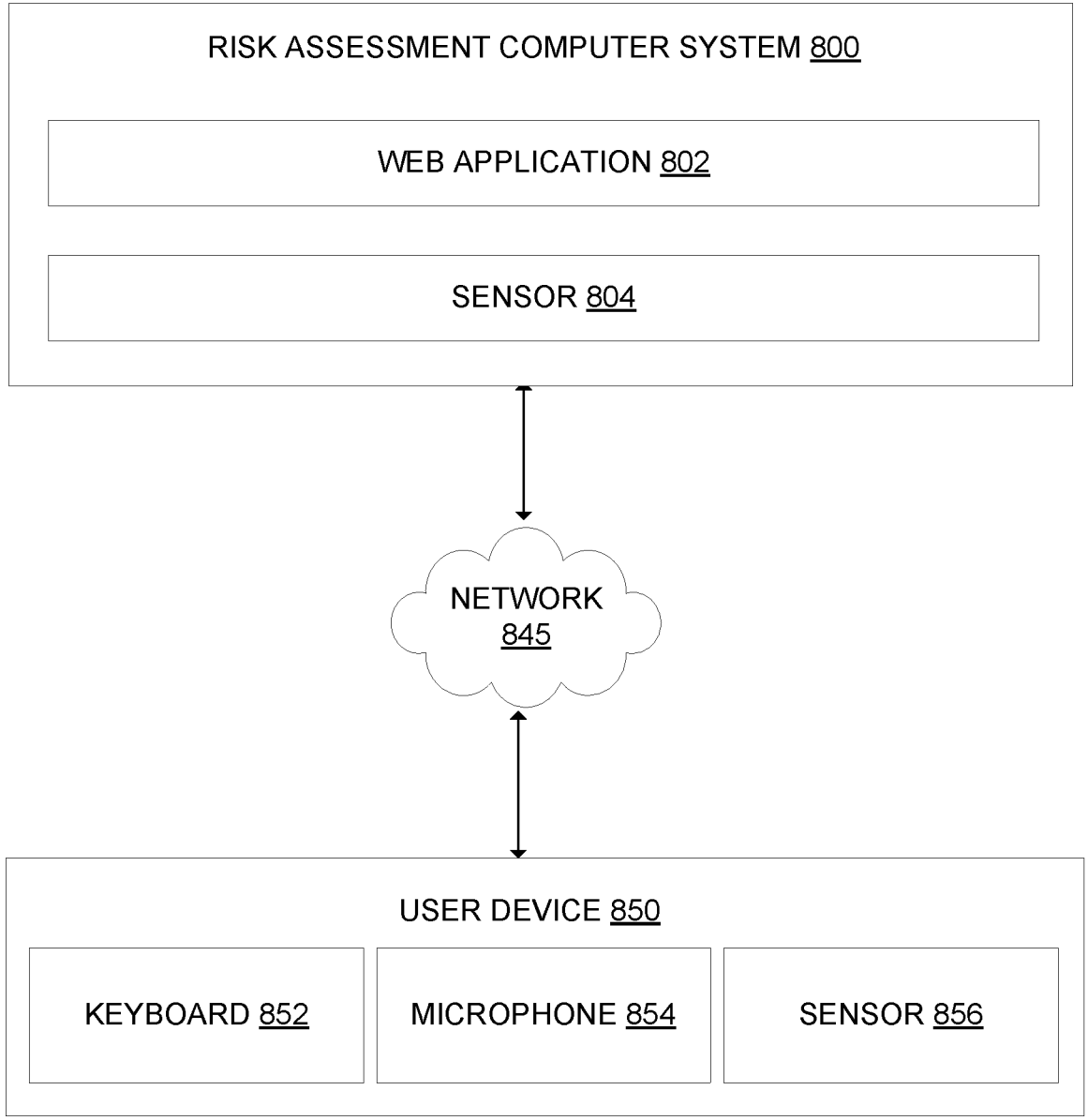
FIG. 8 illustrates a multi-factor authentication (MFA) process, in accordance with the embodiments disclosed herein.

FIG. 8 illustrates an alternate view of a risk assessment computer server, network, and user device for implementing a multi-factor authentication (MFA) process, in accordance with the embodiments disclosed herein. Various components of these devices have been removed to simplify the explanation herein. For example, risk assessment computer system 100, communication network 145, and one or more user devices 150 illustrated in FIG. 1 may correspond with risk assessment computer system 800, communication network 845, and one or more user devices 850 illustrated in FIG. 8.

At user device 850, user may attempt to login to a web application 802 made accessible by risk assessment computer system 800 by communicating with risk assessment computer system 800 via communication network 845. The web application 802 may include an operating system or business tool, for example (e.g., Microsoft® Office 365, Microsoft® Word, Excel, OneNote, Teams, or a cloud-based suite of business tools, etc.).

Web application 802 may require authentication and respond back via communication network 845 to user device 850. User device 850 may receiver interactions via a user interface to accept various forms of authentication, including text-based authentication using a digital or physical keyboard 852 (e.g., password, PIN, etc.), audio-based authentication using a microphone 854 (e.g., voice recognition, audio fingerprints, etc.), or sensor-based recognition (e.g., image analysis, retina scan, fingerprint scan, etc.) using various sensors 856, including a camera, infrared sensor, or the like.

A one-factor authentication may require entry of a username and a password (e.g., via keyboard 852). In this example, the first type of authentication is used because the user enters what they know, including a username and password. Then, the site's server finds a match in a database or similar repository and recognizes the user. Entry of the first type of authentication may result in a first spike in data, as illustrated in the first portion of FIG. 2 and FIG. 5.

In many cases, passwords can be lost or stolen, so the process may incorporate an additional step to login for multi-factor authentication. The additional step may include presenting a hardware key, receiving a text message, typing in a code from a software application from a user device, or using a software application on the user device to initiate biometric authentication process (e.g., fingerprint scanner, retina scanner, etc.).

For multi-factor authentication (MFA) logons, the web application may prompt the user to initiate a second login step, which results in more data communication between user and the business tool or application. This may prompt the user to look to their user device, as an example, to perform the MFA. Illustrations of this second authentication step are shown in FIG. 2 versus FIG. 5, where in FIG. 5 this communication and time delay associated with MFA is not present and the larger spike in data traffic occurs immediately. In comparison to FIG. 2, the user accessing the information from the business tool's or application's server after successful username and password entry may cause a time delay in entry of the second login step. The numerous smaller spikes in FIG. 2 corresponds with, for example, the user entering a code or performing biometric authentication. The downward larger spike in each FIG. 2 and FIG. 5 can signal that the user is authenticated and granted access to the application or website.

Once user device 850 starts to transmit the authentication responses to risk assessment computer system 800, sensor 804 may track the responses. This tracking can include, for example, mirror port ingestion of traffic via a software agent and deep packet inspection, and/or transfer of data to the cloud occurs over HTTPS (e.g., using a JSON payload format). Risk assessment computer system 800 may collect and analyze data, as described throughout the disclosure.

Figure 9:
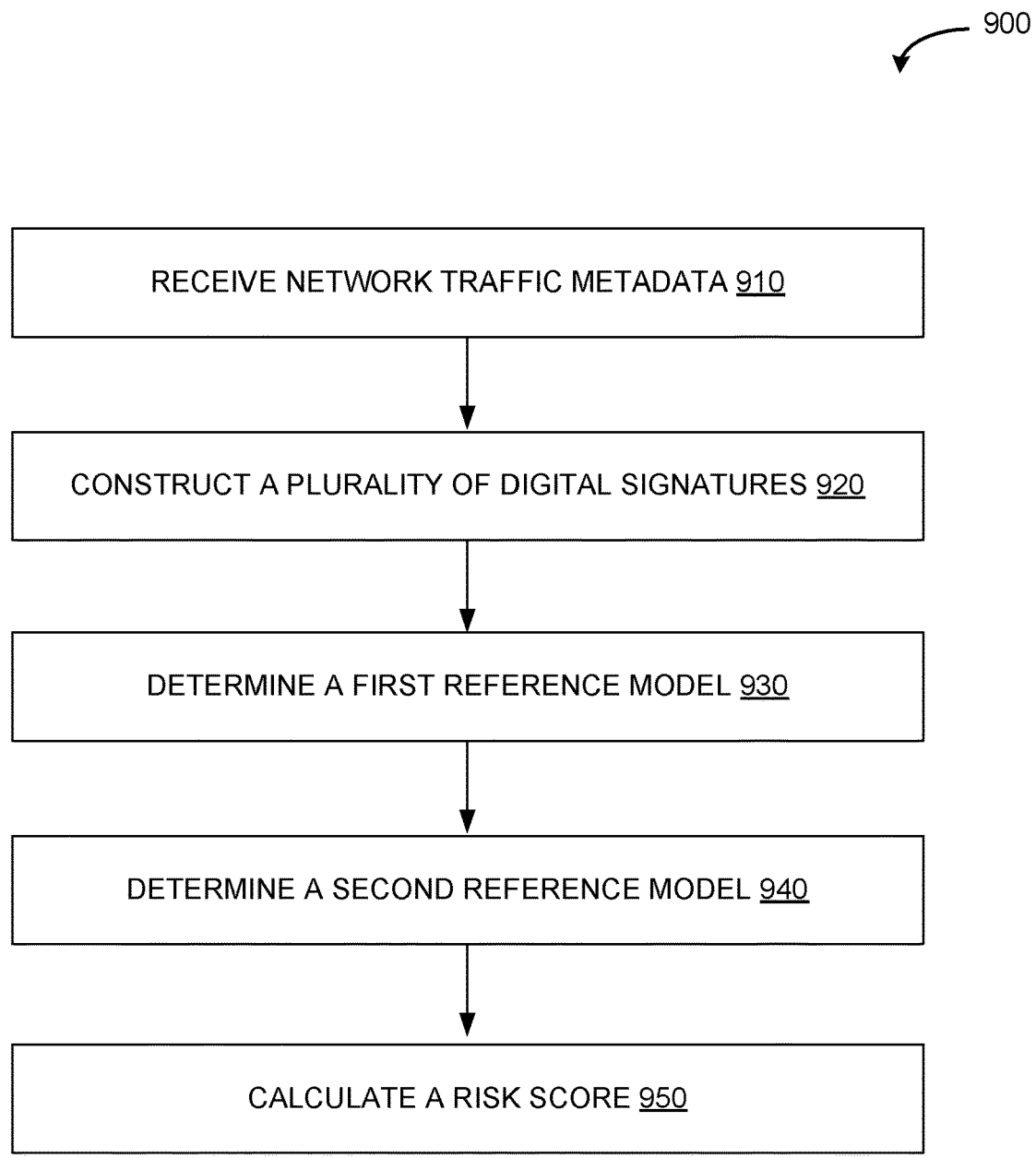
FIG. 9 is a sample flow of calculating a risk score of an entity, in accordance with the embodiments disclosed herein.

FIG. 9 is an example of a flow chart for calculating a risk score of an entity. Process 900 may be executed by a server computer, a controller, or any other similar computing component capable of processing data. In the example implementation of FIG. 9, the computing component executing computer readable instructions to perform the process includes a hardware processor and machine-readable storage medium, similar to an embodiment of risk assessment computer system 100 of FIG. 1.

At step 910, network traffic metadata may be received. For example, the risk assessment computer system can receive network traffic metadata from user interactions on a user device. The network traffic metadata may be associated with user logins to an entity via the communication network.

At step 920, a plurality of digital signatures may be constructed. For example, the risk assessment computer system can construct a plurality of digital signatures of the network traffic metadata associated with the user device. The plurality of digital signatures may be adjusted using a signature calculation process.

At step 930, a first reference model may be determined. For example, the risk assessment computer system can determine a first reference model for the network traffic metadata. The first subset of the user logins to the entity via the communication network may be associated with multi-factor authentication (MFA).

At step 940, a second reference model may be determined. For example, the risk assessment computer system can determine a second reference model for the network traffic metadata. The second subset of the user logins to the entity via the communication network may be associated with non-multi-factor authentication.

Figure 10:
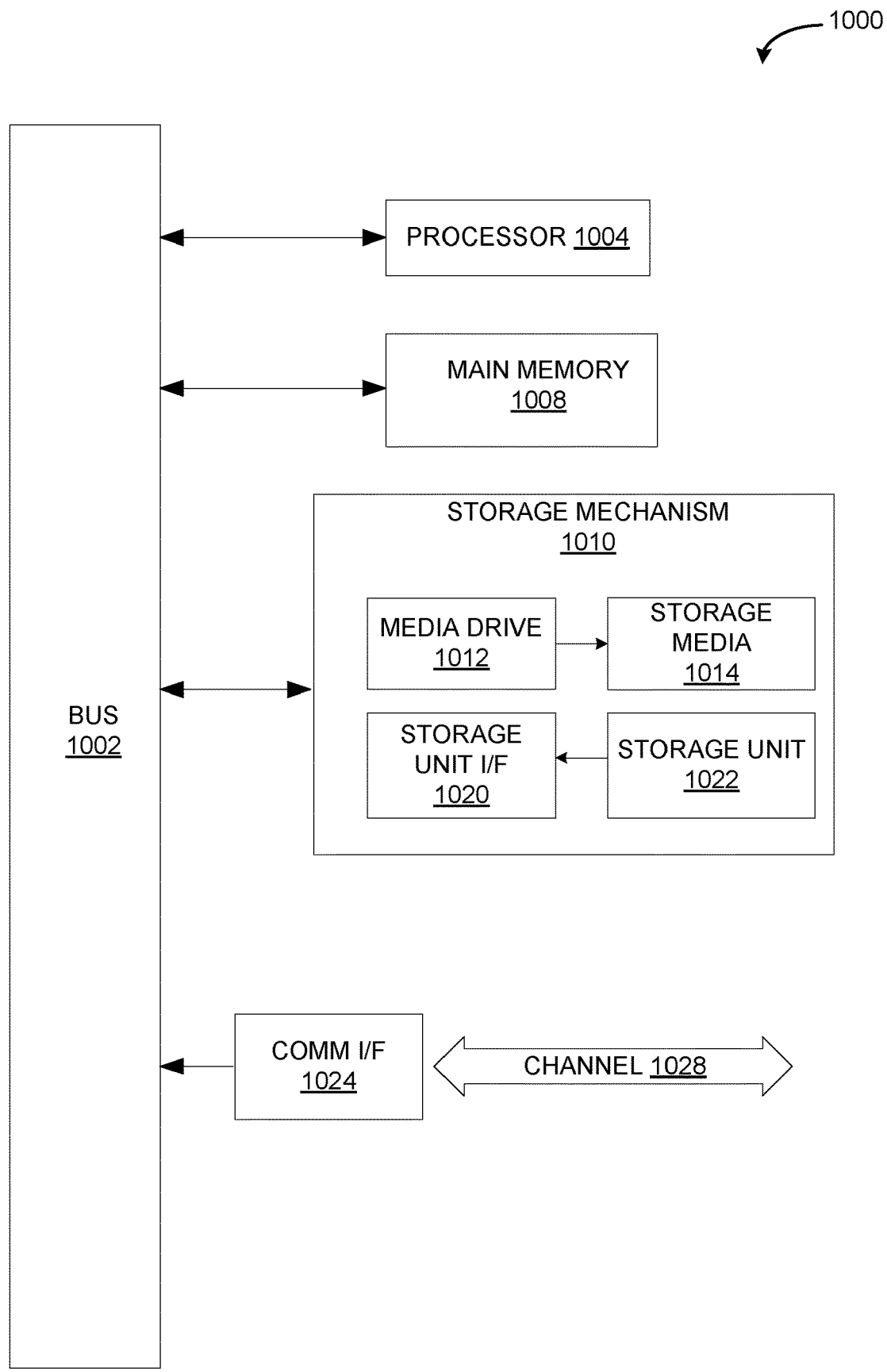
FIG. 10 is an example of a computing system that may be used in implementing various features of embodiments of the disclosed technology.

At step 950, a risk score may be calculated. For example, the risk assessment computer system can calculate a risk score based on a comparison of the first subset of the user logins to the entity network and the second subset of the user logins to the entity via the communication network found in the network data.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 10. Various embodiments are described in terms of this example logical circuit 1000. After reading this description, it will become apparent to a person skilled in the relevant art how to implement the technology using other logical circuits or architectures.

Referring now to FIG. 10, computing system 1000 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 1000 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1000 might include, for example, one or more processors, controllers, control engines, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of logical circuit 1000 or to communicate externally.

Computing system 1000 might also include one or more memory engines, simply referred to herein as main memory 1008. For example, preferably random-access memory (RAM) or other dynamic memory, might be used for storing information and instructions to be executed by processor 1004. Main memory 1008 might also be used for storing temporary variables or other intermediate information during execution of instructions to be executed by processor 1004. Logical circuit 1000 might likewise include a read only memory ("ROM") or other static storage device coupled to bus 1002 for storing static information and instructions for processor 1004.

The computing system 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to, or accessed by media drive 1012. As these examples illustrate, the storage media 1014 can include a computer usable storage medium having stored therein computer software or data.

In alternative embodiments, information storage mechanism 1040 might include other similar instrumentalities for allowing computer programs or other instructions or data to be loaded into logical circuit 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory engine) and memory slot, a PCMCIA slot and card, and other fixed or removable storage units 1022 and interfaces 1020 that allow software and data to be transferred from the storage unit 1022 to logical circuit 1000.

Logical circuit 1000 might also include a communications interface 1024. Communications interface 1024 might be used to allow software and data to be transferred between logical circuit 1000 and external devices. Examples of communications interface 1024 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1000 to perform features or functions of the disclosed technology as discussed herein.

Although FIG. 10 depicts a computer network, it is understood that the disclosure is not limited to operation with a computer network, but rather, the disclosure may be practiced in any suitable electronic device. Accordingly, the computer network depicted in FIG. 10 is for illustrative purposes only and thus is not meant to limit the disclosure in any respect.

Various embodiments of authentication are described herein. For example, multi-factor authentication has evolved as one of the most effective control to insulate an entity against remote attacks. When implemented correctly, MFA can prevent most threat actors from easily gaining an initial foothold into the organization, even if credentials become compromised.

Implementing MFA across an entity's Internet-facing assets can prevent unauthorized access to sensitive data. MFA, when implemented correctly, can be used to safeguard often overlooked points of authentication, such as email and business applications. Without this extra layer of protection, a fraudster can exploit an exposed email account or compromise a poorly-protected application to gain access to additional user information, or may use the compromise as a "foothold" to escalate privileges and gain superuser access to the entire environment.

With the increase of cyber-attacks on entitys' environments, password strength cannot be relied on as the only layer of protection for the entity to prevent fraudsters from gaining unauthorized access. Although not bullet-proof, MFA can lessen the likelihood of a data breach via a compromised password.

Any entity, regardless of size, can adopt an MFA solution as part of their security strategy. For example, an entity can consider most of their employees as not having access to critical information, so they may erroneously rely on only local Windows credentials. Using MFA in addition to local credentials can protect information that may be accessible to all employees. Access to this information may harm the entity if it was accessed by a fraudster.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for determining a risk score of a communication network, the method comprising:
   receiving network traffic metadata from user interactions on a user device, the network traffic metadata associated with user logins to an entity via the communication network absent incorporating payload data of each packet from network traffic;
   constructing a plurality of digital signatures of the network traffic metadata associated with the user device, wherein the plurality of digital signatures are adjusted using a signature calculation process;
   creating a reference model for the network traffic metadata using a subset of the user logins associated with multi-factor authentication;
   determining a number of user logins associated with multi-factor authentications by comparing one or more digital signatures to the reference model;
   calculating a risk score based on the number of user logins associated with multi-factor authentications; and
   transmitting the risk score to a risk assessment system to determine a recommendation.

2. The method of claim 1, wherein the signature calculation process is a dynamic time warping process.

3. The method of claim 1, wherein a subset of the plurality of digital signatures are associated with an unclassified authentication process.

4. The method of claim 3, wherein the subset of the plurality of digital signatures that are associated with the unclassified authentication process are compared with the reference model using a cosine similarity process.

5. The method of claim 3, wherein the subset of the plurality of digital signatures that are associated with the unclassified authentication process are classified as multi-factor authentication based on similarity to the reference model or based on an absolute values of cosine calculations.

6. A non-transitory computer program product for determining a risk score of a communication network, wherein the computer program product comprises:
   receiving network traffic metadata from user interactions on a user device, the network traffic metadata associated with user logins to an entity via the communication network absent incorporating payload data of each packet from network traffic;
   constructing a plurality of digital signatures of the network traffic metadata associated with the user device, wherein the plurality of digital signatures are adjusted using a signature calculation process;
   creating a reference model for the network traffic metadata; using a subset of the user logins associated with multi-factor authentication;
   determining a number of user logins associated with multi-factor authentications by comparing one or more digital signatures to the reference model;
   calculating a risk score based on the number of user logins associated with multi-factor authentications; and
   transmitting the risk score to a risk assessment system to determine a recommendation.

7. The non-transitory computer program product of claim 6, wherein the signature calculation process is a dynamic time warping process.

8. The non-transitory computer program product of claim 6, wherein a subset of the plurality of digital signatures are associated with an unclassified authentication process.

9. The non-transitory computer program product of claim 8, wherein the subset of the plurality of digital signatures that are associated with the unclassified authentication process are compared with the reference model using a cosine similarity process.

10. The non-transitory computer program product of claim 8, wherein the subset of the plurality of digital signatures that are associated with the unclassified authentication process are classified as multi-factor authentication based on similarity to the reference model or based on an absolute values of cosine calculations.

11. A computer system for determining a risk score of a communication network, wherein the computer system comprises:
    one or more computer processors;
    one or more computer readable storage media for storing computer-implemented instructions, wherein the one or more computer processors are configured to execute the computer-implemented instructions to cause the computer system to:
    receive network traffic metadata from user interactions on a user device, the network traffic metadata associated with user logins to an entity via the communication network absent incorporating payload data of each packet from network traffic;

construct a plurality of digital signatures of the network traffic metadata associated with the user device, wherein the plurality of digital signatures are adjusted using a signature calculation process;

create a reference model for the network traffic metadata, using a first subset of the user logins associated with multi-factor authentication;

determining a number of user logins associated with multi-factor authentications by comparing one or more digital signatures to the reference model;

calculate a risk score based on the number of user logins associated with multi-factor authentications; and transmit the risk score to a risk assessment system to determine a recommendation.

12. The computer system of claim 11, wherein the signature calculation process is a dynamic time warping process.

13. The computer system of claim 11, wherein a subset of the plurality of digital signatures are associated with an unclassified authentication process.

14. The computer system of claim 13, wherein the subset of the plurality of digital signatures that are associated with the unclassified authentication process are compared with the reference model using a cosine similarity process.

15. The computer system of claim 13, wherein the subset of the plurality of digital signatures that are associated with the unclassified authentication process are classified as multi-factor authentication based on similarity to the reference model or based on an absolute values of cosine calculations.

* * * * *